United States Patent
Leloup et al.

(10) Patent No.: US 11,147,286 B2
(45) Date of Patent: Oct. 19, 2021

(54) PROCESS OF PREPARING A FOAMING AID AND USES THEREOF

(71) Applicant: NESTEC S.A., Vevey (CH)

(72) Inventors: Valerie Martine Jeanine Leloup, Orbe (CH); Federico Mora, Morges (CH); Eric Dossin, Jougne (FR); Philippe Montavon, Echichens (CH)

(73) Assignee: Societe des Produits Nestle S.A., Vevey (CH)

( * ) Notice: Subject to any disclaimer, the term of this patent is extended or adjusted under 35 U.S.C. 154(b) by 619 days.

(21) Appl. No.: 14/758,031

(22) PCT Filed: Dec. 23, 2013

(86) PCT No.: PCT/EP2013/077883
§ 371 (c)(1),
(2) Date: Jun. 26, 2015

(87) PCT Pub. No.: WO2014/102231
PCT Pub. Date: Jul. 3, 2014

(65) Prior Publication Data
US 2015/0320071 A1    Nov. 12, 2015

(30) Foreign Application Priority Data
Dec. 28, 2012   (EP) ...................................... 12199585

(51) Int. Cl.
*A23F 5/40*   (2006.01)
*A23P 30/40*  (2016.01)
*A23F 5/24*   (2006.01)

(52) U.S. Cl.
CPC .................. *A23F 5/40* (2013.01); *A23F 5/24* (2013.01); *A23P 30/40* (2016.08)

(58) Field of Classification Search
CPC ............... A23F 5/40; A23F 5/24; A23P 30/40
(Continued)

(56) References Cited

U.S. PATENT DOCUMENTS 3,644,122 A    2/1972  Yeransian
5,882,717 A *  3/1999  Panesar ..................... A23F 5/34
                                                    426/443

(Continued)

FOREIGN PATENT DOCUMENTS

| EP | 1021957 | 7/2000 |
| GB | 1073738 | 6/1967 |
| WO | 2012069359 | 5/2012 |

OTHER PUBLICATIONS

Search Report for International Patent Application No. PCT/EP2013/077883 dated Apr. 4, 2014. 3 pages.
(Continued)

*Primary Examiner* — Lien T Tran
*Assistant Examiner* — Tynesha L McClain-Coleman
(74) *Attorney, Agent, or Firm* — K&L Gates LLP

(57) ABSTRACT

The present invention relates to a foaming aid and the processes of preparing the same from a coffee extract. The present invention further relates to the use of the foaming aid in the preparation of a beverage including a coffee product such as a as a soluble coffee product. In particular the present invention relates a coffee product, such as a soluble coffee product, that generates stable espresso-type foam or crema upon reconstitution.

12 Claims, 2 Drawing Sheets

(58) Field of Classification Search
USPC .......................................................... 426/569
See application file for complete search history.

(56) References Cited

U.S. PATENT DOCUMENTS

| | | | |
|---|---|---|---|
| 6,713,113 B2 | 3/2004 | Bisperink et al. | |
| 9,591,863 B2 | 3/2017 | Imison | |
| 2006/0088627 A1* | 4/2006 | Bartnick | A23F 3/163 |
| | | | 426/52 |
| 2007/0248731 A1 | 10/2007 | Curti et al. | |
| 2007/0259084 A1* | 11/2007 | Gaonkar | A23F 5/40 |
| | | | 426/417 |
| 2010/0215818 A1 | 8/2010 | Kessler et al. | |
| 2011/0141270 A1 | 6/2011 | Miyake | |
| 2011/0212240 A1* | 9/2011 | Zehentbauer | A23C 9/156 |
| | | | 426/534 |
| 2013/0337123 A1 | 12/2013 | Fisk et al. | |

OTHER PUBLICATIONS

Written Opinion for International Patent Application No. PCT/EP2013/077883 dated Apr. 4, 2014. 7 pages.

Simone Blumberg et al., "Quantitative Studies on the Influence of the Bean Roasting Parameters and Hot Water Percolation on the Concentrations of Bitter Compounds in Coffee Brew," Journal of Agricultural and Food Chemistry. vol. 58, No. 6, Feb. 24, 2010. pp. 3720-3728, XP055064049.

Ernesto Illy et al., "Neglected Food Bubbles: The Espresso Coffee Foam," Food Biophysics, vol. 6, No. 3, Mar. 30, 2011. pp. 335-348, XP055064224.

Alessandra D'Agostina et al., "Investigations on the High Molecular Weight Foaming Fractions of Espresso Coffee," Journal of Agricultural and Food Chemistry. vol. 52. No. 23. Nov. 1, 2004. pp. 7118-7125, XP055062787.

Japan Office Action for Application No. P2015-550062, Dispatch No. 492695, dated Nov. 7, 2017, 17 pages.

* cited by examiner

PROCESS OF PREPARING A FOAMING AID AND USES THEREOF

CROSS REFERENCE TO RELATED APPLICATIONS

The present application is a National Stage of International Application No. PCT/EP2013/077883, filed on Dec. 23, 2013, which claims priority to European Patent Application No. 12199585.6, filed on Dec. 28, 2012, the entire contents of which are being incorporated herein by reference.

TECHNICAL FIELD OF THE INVENTION

The present invention relates to a foaming aid and the processes of preparing the same from a coffee extract. The present invention further relates to the use of the foaming aid in the preparation of a beverage including a coffee product such as a soluble coffee product. In particular the present invention relates to a coffee product, such as a soluble coffee product, that generates stable espresso-type foam or crema upon reconstitution.

BACKGROUND OF THE INVENTION

In espresso coffees, persistent foam also referred to as "crema" represents a visual quality criterion. The volume, texture, finesse, color and stability of the crema are distinctive characteristics appealing to the consumer. Crema results from the extraction of surface active coffee components that coat and stabilize the gas bubbles created by blasting the tamped espresso coffee matrix with pressurized heated water.

The development of a soluble coffee delivering espresso-type crema upon reconstitution would definitively represent a competitive advantage in the field of coffee beverage production. The scientific and technical challenges are considerable since soluble coffee composition and preparation of the same are quite different from espresso extraction.

As concerns coffee processing, the industrial extraction allows the extraction of additional polysaccharides and nitrogen-rich compounds during the extraction phase. Changes in the physical state of extracted coffee compounds occur upon subsequent concentration leading to aggregation and sedimentation of the compounds. The role of these compounds specific to soluble coffee and the impact of their physical state on foaming properties of coffee are poorly understood.

WO 2009/040249 and EP 0839457 disclose processes of making an instant coffee, particularly a spray-dried instant coffee, which, when contacted with hot water, produces a foam which simulates espresso crema. As part of the soluble "espresso" coffee generation process, the extract is foamed by pressurized gas injection, and spray dried under sufficient drier outlet temperature and spray pressure conditions to obtain porous particles with gas bubbles incorporated therein. The incorporation of minute size gas bubbles is essential for the delivery of an improved in-cup foam.

Product appearance and pleasure during consumption are key attributes driving consumer preference. Foam volume, stability and appearance play a pivotal role for the perceived quality of coffee beverages. A pure soluble coffee that produces stable espresso-type crema would therefore represent a clear advantage in the field.

SUMMARY OF THE INVENTION

Thus, an object of the present invention relates to the provision of a foaming aid suitable for use in beverages in particular coffee beverages. In particular, it is an object of the present invention to provide a foaming aid that improves the foam volume, stability and appearance of a beverage such as a coffee beverage, for example an instant coffee beverage.

A further object of the present invention relates to the provision of a process of preparing a coffee product having improved foam volume, stability and appearance.

Thus, one aspect of the invention relates to a process of making a foaming aid comprising the steps of
(i) providing a coffee extract,
(ii) isolating a surface active fraction of said extract to obtain a foaming aid.

Another aspect of the present invention relates to a foaming aid obtainable from the above mentioned process of the invention.

Yet another aspect of the present invention relates to the use of a surface active fraction isolated from a coffee extract as a foaming aid.

A further aspect of the present invention relates to a process of making a coffee product comprising the steps of:
(a) providing a coffee extract,
(b) adding a foaming aid of the invention to said coffee extract provided in step (a).

Still another aspect of the present invention relates to a coffee product obtained by the process of making a coffee of the present invention.

Finally, one aspect of the present invention relates to a container comprising the coffee product of the present invention.

BRIEF DESCRIPTION OF THE FIGURES

In FIG. 2 the large dashed line represents the Standard; the solid thick black line represent the Reference, the small dashed line represents a coffee where the sediment has been added and the solid thin black line represents solubilized in KOH.

Figure 1:
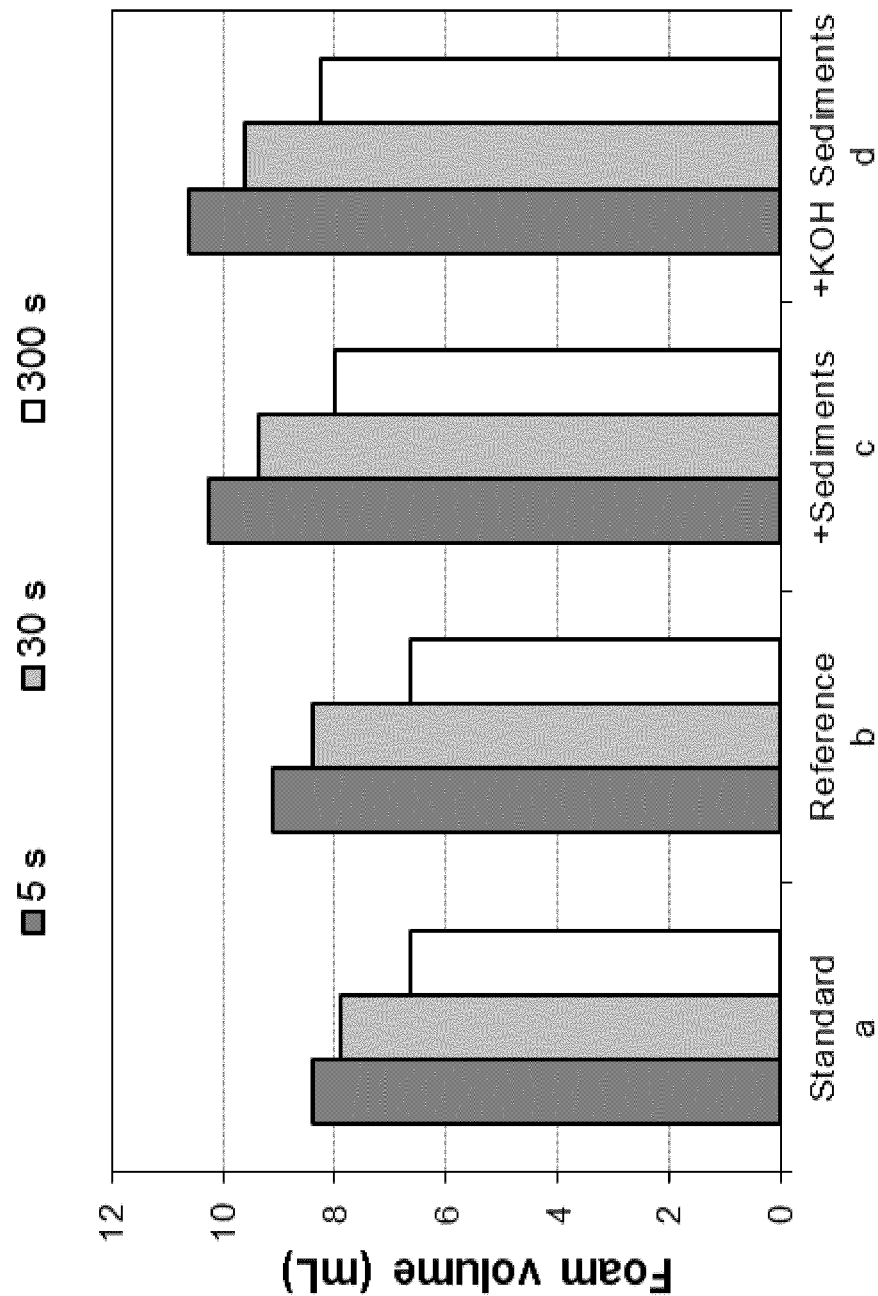
FIG. 1 shows foam volumes of reconstituted coffee powders evaluated at 85° C. by foam measuring device at 5 (black bar), 30 (grey bar) and 300 s (white bar) at 2.5% TC.

The present invention will now be described in more detail in the following.

DETAILED DESCRIPTION OF THE INVENTION

Compared to espresso, industrial coffee manufacture allows for extracting more molecules and favoring physical changes of coffee compounds during extraction, concentration and drying. The impact of these process steps on foaming properties is poorly understood. Building scientific understanding of coffee foam chemistry and physics will enable the development of appropriate process solutions to refine coffee composition and powder structure for optimal foam delivery upon reconstitution.

Thus, an object of the present invention relates to the provision of processes of making an improved coffee product having improved foam upon reconstitution. The objective of the present inventors was therefore to establish the molecular and structural basis of coffee foam and to develop means for improving foam volume, appearance and stability upon reconstitution of an instant powder.

As concerns coffee processing, the industrial extraction procedure allows the extraction of additional polysaccharides and nitrogen-rich compounds. The use of high temperature also results in the formation of non-soluble material, the so-called thermal sediments. The present inventors discovered that better foaming performance of the final powdered coffee was obtained with these thermal sediments.

Definitions

Prior to discussing the present invention in further details, the following terms and conventions will be defined:

Crema

The term "crema" refers to the froth covering the surface of a high quality cup of espresso the colour of which varies from reddish brown to beige. Crema is very important in making a good espresso. The presence of crema is the main difference between drip coffee and espresso. Crema releases potent coffee aroma and flavour compounds remaining in the mouth and throat long after drinking the espresso.

Foaming Aid

As mentioned the present invention relates to the provision of a foaming aid. In the context of the present invention, a foaming aid refers to an agent that can be added to a foaming substance to improve its foaming properties. This foaming substance in the present invention may preferably refer to a coffee beverage for example an instant coffee beverage.

Surface Active Fraction

In the context of the present invention the term "surface active fraction" refers to a fraction (or composition) capable of lowering the surface tension of a liquid. The surface active fraction described herein is a composition isolated (or obtainable by isolation) from coffee extract. In the preferred embodiment, the "surface active fraction" or "surface active composition" is the thermal sediments described herein that may be isolated by centrifugation. The thermal sediments are a composition comprising nitrogen-rich compounds, wherein hydrophobic amino acids account for approximately 50% (w/w) of the composition.

Polyphenols

In the context of the present invention, "polyphenols" refers to a structural class of natural, synthetic, and semisynthetic organic chemicals characterized by the presence of large multiples of phenol units. The number and characteristics of these phenol substructures underlie the unique physical, chemical, and biological properties of particular members of the class.

Nitrogenous Compounds

In the context of the present invention, "nitrogenous compounds" refers to a structural class of natural, synthetic, and semisynthetic organic chemicals characterized by the presence of large amounts of nitrogen atoms within their structure. The term "large amounts of nitrogen atoms" relates to an increased amount of nitrogen atoms relative to the starting material determined on a dry weight basis and/or on the basis of total solid content.

Melanoidins

In the context of the present invention, Melanoidins are brown, heterogeneous polymers that are formed either by the Maillard reaction, when sugars and amino acids combine at high temperatures and low water activity or by autoxidation and polymerization of phenolic compounds. Melanoidins are commonly present in foods that have undergone some form of non-enzymatic browning. In the presence of phenolic compounds, as it is the case in coffee, both the Maillard reaction and the autoxidative processes contribute to the formation of melanoidins during heat treatment, e.g. roasting. Melanoidins constitute up to 25% of the coffee beverages' dry matter.

Dry Weight

The dry weight refers to the measurement of the mass of matter when completely dried and all fluids are completely removed from the matter. The dry weight % of a substance refers to the relative amount of said substance in the total dry weight matter. For example, if 100 grams (dry weight) matter, e.g. obtained from a coffee extract, contains 30 grams of mannan, then the dry weight % of mannan in said extract is 30%.

Total Solid Content (TC)

The total solid content (TC) refers to the mass of matter in a solution or a suspension. The TC of a coffee solution or suspension is defined as the weight (w) of the dried coffee residue expressed as a percentage of the original coffee solution or suspension in weight/weight percent (w/w %). Conversely, when preparing a coffee solution or suspension, it is the weight of the dry coffee powder (e.g. coffee extract) used to generate the coffee solution or suspension expressed in weight/weight percent (w/w %). For example, if 5 g (dry weight) of a coffee extract is used to generate 50 g of a coffee solution, then the TC of this solution is 10% (w/w %).

Beverage

In the context of the present invention, a beverage refers to a liquid prepared for human consumption. A powdered beverage refers to a dry matter product (such as an instant powder) which may be reconstituted into a beverage by the addition of a liquid such as water. The term hot beverage refers to a beverage which is served heated. A hot beverage may be obtained by the addition of a heated liquid (for example in the form of water or milk) or by heating the beverage as such. Instant coffee is a beverage derived from brewed coffee beans. Instant coffee is obtained from the coffee extract, which is dehydrated into the form of powder or granules. These can be rehydrated with hot water or cold to provide a drinkable coffee beverage. Instant coffee may also be provided in the form of a concentrated coffee extract in liquid form.

At an industrial scale coffee processing typically consists of a number of successively performed operations, as follows:

grading, storage, blending of green coffees;
roasting and grinding;
extraction to obtain a coffee extract;

While instant coffee manufacturing includes a further step of:

drying, by either spray; or freeze-drying.
Process of preparing a foaming aid from a coffee.

Thermal sediments are nitrogen-rich compounds (6-7 weight %) half of which accounts for hydrophobic amino acids (i.e. LEU/ILE, VAL, PRO, PHE). The sediments also contain other classes of compounds known as melanoidines. Thermal sediments exhibit surface active properties and are formed during the extraction phase of coffee.

Applying the isolated thermal sediments to instant coffee extract subjected to gas injection, the inventors discovered that the thermal sediments improve the foam stability of the coffee product upon reconstitution of the resulting powder. Indeed, thermal sediments contain surface active compounds that have the ability to easily adsorb at the gas in extract interface. When some time is allowed for the thermal sediments to reorganize at the gas in extract interface of the gassed coffee extract, gas bubbles are efficiently entrapped and stabilized as observed by the higher porosity of the resulting powder and foam volume upon reconstitution of the powder. The solubilization of thermal sediments using an alkali such as potassium hydroxide (KOH) improves Crema stability and appearance although the resulting Crema becomes slightly darker. The drainage rate is decreased resulting in more persistent Crema. Finally, Crema viscosity is enhanced delivering more mouthfeel upon consumption. The instant coffee powders in which thermal sediments were incorporated show a slight increase in nitrogenous compounds.

A further object of the present invention relates to the provision of processes of making a foaming aid suitable for use in a beverage such as a coffee product.

Accordingly, the invention relates to a process of making a foaming aid comprising the steps of
(i) providing a coffee extract,
(ii) isolating a fraction of said extract, where said fraction is having surface active properties. The isolated fraction (referred to as surface active fraction) may be used as a foaming aid e.g. in a beverage such as a coffee beverage. Preferably, the isolated surface active fraction is provided in the form of thermal sediments generated in the hot extraction phase. The thermal sediments may be isolated by centrifugation.

Thus, one aspect of the invention relates to a process of making a foaming aid comprising the steps of
(i) providing a coffee extract,
(ii) isolating a surface active fraction of said extract to obtain a foaming aid.

The coffee extract referred to herein and employed by the processes of the present invention is typically obtained by hot extraction of roasted and ground coffee beans. Hot extraction is generally performed at a temperature in the range of 110 to 200° C., for example 140 to 200° C., such as in the range of 150 to 190° C., preferably in the range of 150 to 180° C. Thus, in one embodiment of the present invention, the coffee extract provided in step (i) and/or in step (a) is/are obtained by hot extraction. In another embodiment, the coffee extract provided in step (i) and/or in step (a) is/are in liquid form (e.g. an aqueous coffee extract). In another embodiment, step (ii) and/or in step (b) is/are performed after said hot extraction.

In one embodiment, the coffee extract provided in step (i) and/or in step (a) is/are an extract of green coffee beans, roasted coffee beans or a mixture thereof.

Thermal sediments are generally high molecular weight compounds. Accordingly, the surface active fraction isolated in step (ii) of may preferably be isolated by centrifugation or filtration.

The fraction (surface active fraction) isolated from the coffee extract preferably contains polyphenols and nitrogenous compounds, which contribute to the foam aiding activity of the surface active fraction. Thus, in one embodiment, said surface active fraction comprises at least one compound independently selected from the group of polyphenols and nitrogenous compounds.

It may be advantageous to concentrate the surface active fraction to obtain a composition having high concentration of the foam aiding substances e.g. polyphenols and nitrogenous compounds. In one embodiment of the present invention, the process of making a foaming aid therefore comprises a further step of concentrating said surface active fraction. Accordingly, in a preferred embodiment the concentration of said at least one compound independently selected from the group of polyphenols and nitrogenous compounds in said foaming aid is greater than the concentration of said compound in said coffee extract provided in step (i) of the process of making the foaming aid of the invention. In one embodiment, the concentration of polyphenols and nitrogenous compounds is at least two fold higher in the isolated surface active fraction after it has been subjected to concentration compared to concentration of the compounds in the coffee extract. In another embodiment, the concentration of polyphenols and nitrogenous compounds in the isolated surface active fraction after it has been subjected to concentration is at least 5 fold higher, such as at least 10 fold higher, for example at least 20 fold higher, such at least 50 fold higher, for example at least 100 fold higher than the concentration of the compounds in the coffee extract from which they were obtained.

In one preferred embodiment of the present invention, the surface active fraction is a composition comprising polyphenolic compounds obtainable by Maillard and autoxidative polymerization of at least two 4-vinylcatechol monomers obtained from free caffeic acid or the caffeic acid moiety of a chlorogenic acid.

In another preferred embodiment, said surface active fraction is a composition comprising at least one polyhydroxylated phenylindane. In one embodiment, wherein said surface active fraction is a composition comprising at least one multiply hydroxylated phenylidance selected from the list consisting of trans-5,6-Dihydroxy-1-methyl-3-(3'-4'-dihydroxyphenyl) indane, cis-5,6-Dihydroxy-1-methyl-3-(3'-4'-dihydroxyphenyl) indane, 1,3-bis(3'-4'-dihydroxyphenyl)butane, trans-1,3-bis(3'-4'-dihydroxyphenyl)butene, 5,6-Dihydroxy-2-carboxy-1-methyl-3-(3'-4'-dihydroxyphenyl) indane, trans-4,5-dihydroxy-1-methyl-3-(3',4'-dihydroxyphenyl) indane, cis-4,5-dihydroxy-1-methyl-3-(3',4'-dihydroxyphenyl) indane, trans-5,6-dihydroxy-1-methyl-3-[3',4'-dihydroxy-5-(1-(3",4"-dihydroxyphenyl)-1-ethyl)phenyl] indane, cis-5,6-dihydroxy-1-methyl-3-[3',4'-dihydroxy-5'-(1-(3",4"-dihydroxyphenyl)-1-ethyl)phenyl]indane and 5,6-dihydroxy-1-methyl-2-[1-(3',4'-dihydroxyphenyl)-1-ethyl]-3-(3",4"-dihydroxyphenyl) indane.

In one preferred embodiment, said surface active fraction is a composition comprising trans-5,6-Dihydroxy-1-methyl-3-(3'-4'-dihydroxyphenyl) indane, cis-5,6-Dihydroxy-1-methyl-3-(3'-4'-dihydroxyphenyl) indane and trans-1,3-bis(3'-4'-dihydroxyphenyl)butene. In another preferred embodiment, said (surface active fraction) is a composition comprising trans-5,6-Dihydroxy-1-methyl-3-(3'-4'-dihydroxyphenyl) indane and cis-5,6-Dihydroxy-1-methyl-3-(3'-4'-dihydroxyphenyl) indane.

In one preferred embodiment of the process of making a foaming aid, the surface active fraction is a composition comprising brown-coloured, high molecular weight nitrogenous compounds derived from proteins, amino acids, sugars and chlorogenic acids from said extract obtained via Maillard and autooxidative reactions.

In another preferred embodiment, the nitrogenous compounds of the surface active fraction are melanoidins. In one preferred embodiment, the surface active fraction comprises at least 5% carbohydrates, 5% free chlorogenic acids, 25% free amino acids, and 75% brown-coloured, high molecular weight melanoidins.

The inventors discovered that the foam aiding activities of the isolated surface active fraction may be improved by treating the surface active fraction with an alkali. Thus, in a preferred embodiment, the process of preparing the foaming aid of the invention comprises a further step of treating said surface active fraction with an alkali. Preferably, the alkali is potassium hydroxide.

A foaming aid derived from coffee extract and use thereof.
The inventors have discovered that the surface active fraction isolated from coffee extract (e.g. in the form of thermal sediments as described herein) has surface active properties and may be used as a foaming aid for example in beverages such as a coffee beverage.

Accordingly, another aspect of the present invention relates to a foaming aid obtainable from the process of making a foaming aid as described herein.

The foaming aid may be provided in different forms in order to adapt to the further uses thereof. In one embodiment of the present invention, the foaming aid is in liquid form. In another embodiment, the foaming aid is in dry form such as a power or a granulate.

A further aspect of the present invention relates to the use of a surface active fraction isolated from a coffee extract as a foaming aid. In one embodiment, the surface active fraction is a surface active fraction obtainable by the process of the present invention relating to the making of a foaming aid. Accordingly, in one embodiment the surface active fraction is having the physio/chemical characteristics as referred herein for the process of making of a foaming aid.

In a further embodiment, the surface active fraction is used a foaming aid in a beverage. The beverage may be in various forms were foaming is desirable such as beer or coffee. In a preferred embodiment, the surface active fraction of the invention is used as a foaming aid in a coffee product, preferably an instant coffee product.

Process of preparing a coffee extract.

Yet a further object of the present invention relates to the provision of processes of making an improved coffee product having improved foam upon reconstitution.

Thus, a further aspect of the present invention provides a process of making a coffee product comprising the steps of:
 (a) providing a coffee extract,
 (b) adding a foaming aid of the present invention to said coffee extract provided in step (a).

In the process the foaming aid of the invention may be added to the coffee extract. However, in a preferred approach a surface active fraction as described herein is removed from the coffee extract prior to (re)introducing the surface active fraction as a foaming aid later in the coffee manufacturing process.

Thus, in one embodiment of the present invention, a surface active fraction has been removed from the coffee extract provided in step (a). Preferably the surface active fraction referred to this embodiment contains or essentially contains the same combination of compounds present in the foaming aid of the present invention.

The process of making a coffee product according to the present invention preferably further comprises at least one step of concentrating said coffee extract.

Since the thermal sediments can contribute to fouling in the process, it is preferred that they are removed from the coffee extract. Accordingly, in a preferred embodiment, said surface active fraction has been removed from the coffee extract provided in step (a) prior to said at least one step of concentrating said coffee extract.

In another preferred embodiment, the at least one step of concentration of said coffee extract is a step of evaporation. Typically the coffee product is dried to dry coffee product, for example in the form of a powder or granulate. The dehydration may be performed using means known to the person skilled in the art such as spray drying, freeze drying or thermal evaporation. Preferably, the coffee product is dehydrated to obtain a coffee product having a moisture content of 6% (weight %) or below, such as 5% (weight %) or below, preferably 4% (weight %) or below.

The surface active fraction in the form of the foaming aid of the present invention is (re)introduced in the process of making a coffee product as referred to in step (b), for example at the stage where the coffee extract is in the form of a heavy liquor (after concentration of the coffee extract, e.g. by evaporation, and before final drying, e.g. by spray drying or freeze drying). As mentioned, it is preferred but not essential that a surface active fraction, e.g. in the form of thermal sediments, was removed from the coffee extract earlier in the process, preferably before the concentration of the coffee extract.

The foaming aid may be introduced at various stages in the coffee making process; however, it is preferably introduced after the concentration of the coffee extract.

Thus, in one embodiment, the foaming aid is added prior to drying said coffee extract. In a second embodiment, said foaming aid is added after drying said coffee extract, for example by adding the foaming aid to the coffee powder/granulate or the final coffee liquid concentrate.

The foaming aid introduced may originate from the same coffee extract for which it is used (thus a true add-back). Alternatively and typically, the foaming aid is prepared in advance from one batch of coffee extract and used in the preparation of a coffee product. In the latter scenario, the foaming aid thus does not originate (at least not entirely) from the same coffee extract into which it is introduced.

The process of the present invention may be applied for the manufacturing of various types of coffee products. In one embodiment, said coffee product is a soluble coffee product. In another embodiment, said coffee product is in the form of a water-soluble powder or granulate. In a further embodiment, said coffee product is in a liquid form, such as a coffee concentrate.

One embodiment of the present invention concerns the process of making a coffee product, wherein said coffee products is a coffee product selected from the list consisting of instant coffee, instant espresso coffee, liquid coffee concentrate, coffee mixes, coffee mixtures, roast and ground coffee with or without capsules, mixes of roast and ground and instant coffee, and ready-to-drink coffee beverages.

Coffee Extract

The present invention further provides a coffee product obtained by the process of the invention. Thus, one aspect of the present invention relates to a coffee product obtained by the process (coffee manufacturing process) of the present invention.

The coffee products of the invention may be provided in the form a soluble coffee product. The coffee products of the invention may be in the form of a water-soluble powder or granulate. The coffee products of the invention may be in a liquid form, such a coffee concentrate. In one embodiment, the coffee products is a coffee product selected from the list consisting of instant coffee, instant espresso coffee, liquid coffee concentrate, coffee mixes, coffee mixtures, roast and ground coffee with or without capsules, mixes of roast and ground and instant coffee, and ready-to-drink coffee beverages.

For all of the preparations described herein, the resulting coffee product (the end product of the process) can also be used in combination with one or more other ingredients such as flavours, milk, creamers, chicory, cereals and sugar.

The coffee product of the invention is typically packed into containers such as jars, tins, bags or capsules. Thus, still another aspect of the present invention is to provide a container comprising the coffee product of the present invention. The container may be in various forms depending on the application and nature of the content. In one embodiment, the container is a capsule.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

The objective of the present study was to assess the impact of thermal sediments on foaming properties of soluble coffee by comparing trials with or without prior removal of thermal sediments. In order to combine optimized process performance (i.e. thermal sediment removal) and product foaming properties (i.e. thermal sediment add-back), different sediment removal/add-back strategies were also investigated. The present study compares the foaming performances of these different trials.

Accordingly, pilot trials were conducted with/without thermal sediment removal and with/without thermal sediment reincorporation in concentrated extract. In one of the trials, thermal sediments were solubilized in potassium hydroxide (KOH) prior to their reincorporation. The concentrated extracts were further dried. The powders were characterized for their foaming performance. Foaming properties were evaluated using the foam measurement device (FMD) (auto-foaming), KOMO (foamability), and sugar test (foam viscosity). Surface active properties were evaluated at short (BPA) and long time (Tracker).

Soluble coffee was produced by extraction of roast and ground coffee beans by methods generally known in the art of producing soluble coffee, involving extraction temperatures up to 170° C. In the experiments with sediment removal, this was removed by centrifugation of the coffee extract after extraction. The coffee extract was concentrated by evaporation, by methods generally known in the art of producing soluble coffee. In the experiments where sediment was added, it was added to the concentrated extract after evaporation and before drying. The concentrated extracts were dried by spray drying, wherein gas was injected into the extract before spraying to produce a porous powder able to produce crema upon dissolution, using the method disclosed in WO 2009/040249.

A series of four trials were performed to assess the effect of thermal sediments on the foaming performance of the soluble powders. The trials consisted of:
1. Coffee manufacturing process with centrifugation (Standard), (referred to as trial ref #a);
2. Coffee manufacturing process without centrifugation (Reference), (referred to as trial ref #b);
3. Coffee manufacturing process with centrifugation and sediment add-back (+sediments), (referred to as trial ref #c);
4. Coffee manufacturing process with centrifugation and solubilized sediment add-back (+KOH sediments), (referred to as trial ref #d).

Trial Conditions:

Sediment handling—At the exception of the Reference trial, the thermal sediments were recovered by centrifugation.

Sediment reincorporation—Thermal sediments (89.6 Kg, TC 20%) were added batchwise to the thick extract (TC 57%) before gas injection, accounting for about 14% of the dried final powder (weight %).

Sediment solubilisation—9 kg of food-grade KOH (~9%) is added to 87.8 kg of thermal sediments (TC 20%) in a tank. The mixture was mechanically stirred for about 15 minutes until the pH stabilized to 8. The resulting mixture was reincorporated to the thick extract as described, corresponding to an addition of 13.5% of dry sediments and 0.2% potassium on dry final powder.

Characterization of Foam Properties

The foaming properties were evaluated as follows:

Foam measuring device (FMD) analysis—The auto-foaming properties of the powder were measured: The powder is reconstituted at 2.5% TC and 85° C. The foam volume is measured at time 5 s, 30 s and 300 s.

KOMO analysis—The foamability of the extract was measured: Coffee extracts (i.e. 0.1-2%) were prepared by solubilization of instant powder in MilliQ water at 75° C.; 84 mL of coffee extracts were whipped in the KOMO machine and the foamed liquid was recovered in a volumetric cylinder. The foam volume was recorded every 30 s up to 3 min. The initial foam volume and foam decay rate were extrapolated from the foam volume curves using a logarithmic model.

Example 1

Powder Porosity

The analysis of the powder porosity of the powders produced in example 1, revealed that the powder porosity is higher for powders containing thermal sediments, i.e. d (61.2%), c (64.8%), b (66.1%) versus a (59.4%). Thermal sediments most likely increase the amount of surface active compounds allowing for more efficient trapping and retention of nitrogen gas within the powder.

Example 2

Auto-Foaming Properties (FIG. 1)

The auto-foaming properties of powders produced in example 1 were measured with FMD on extracts reconstituted at 2.0% TC at 85° C. The values were further corrected for a 2.5% TC extract (FIG. 1). Analysis of the auto-foaming properties revealed that the lowest foam volume was found when sediments had been removed by centrifugation and not added back (i.e. a, 8.4 mL foam). The highest foam volume was found when sediments had been removed by centrifugation and further reincorporated into the heavy liquor sediments, (i.e. d, 10.3-10.6 mL foam). Intermediate volumes were obtained for the non-centrifuged extract (i.e. b, 9.1 mL foam).

In conclusion, thermal sediments positively contribute to the formation of a foam interface that can effectively trap nitrogen to deliver larger foam volumes.

Example 3

Crema Appearance and Viscosity (FIG. 1)

The analysis of foam volume, stability and appearance revealed that the powders from trials containing thermal sediments, i.e. d (10.6 mL), c (10.3 mL), b (9.1 mL) versus a (8.4 mL) delivered more foam volume at cup surface. The foam was more persistent for trials in which sediments have been first removed by centrifugation and then added back to the heavy liquor (i.e. a, b). When solubilized in potassium hydroxide (i.e. b), the foam was fine, homogenous and more viscous although of darker color.

Example 4

Figure 2:
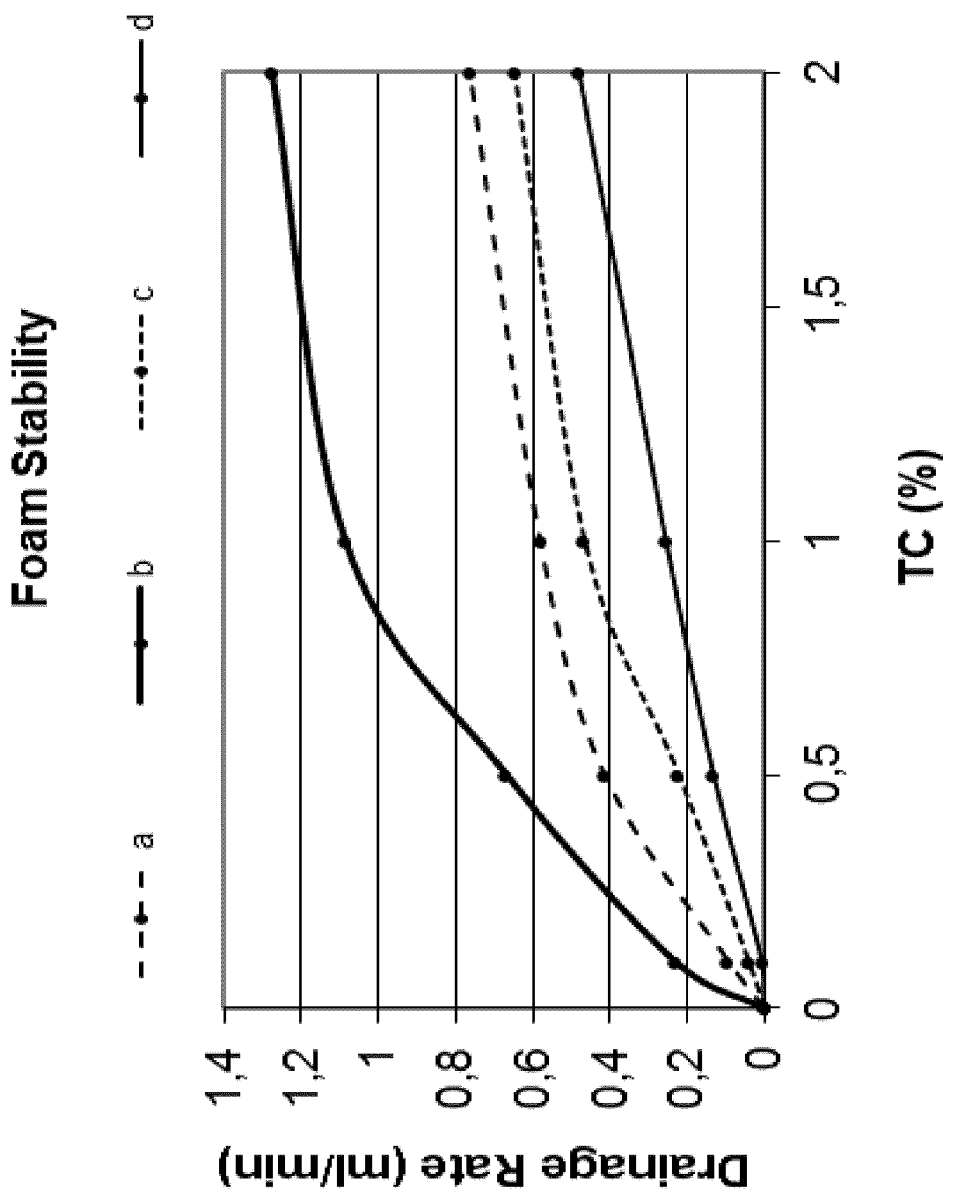
FIG. 2 shows the effect of thermal sediments on (i) the initial foam volume of reconstituted coffee and the effect on (ii) drainage rate/stability of the foam.

Drainage Rate of Coffee Extracts (FIG. 2)

The foamability of reconstituted extracts was evaluated by whipping (high energy input) using a KOMO machine. The analysis of the foam revealed that the highest foam volume was found for the reference coffee (i.e. a, 30 mL). However, it also exhibited the fastest foam drainage rate (i.e. 1.3 mL/min). The presence of thermal sediments in the powder (i.e. d, c, b) results in lower foam volume (i.e. 23-24 mL) but improved foam stability (i.e. 1.1-1.3 mL/min), i.e. decreased drainage (see FIG. 2). In conclusion, thermal sediments improve foam stability.

Example 5

Surface Tension

The surface tension of the reconstituted powders was measured at short time scale and at equilibrium. At short time scale, all products, b excepted, display more or less the same kinetics with rapid adsorption of surface active material. The b trial shows unexpectedly slower adsorption kinetics. At equilibrium all extracts behaved similarly, indicating that molecular reorganisation processes occurring at interfaces were completed.

In conclusion, the thermal sediments contain surface active compounds that have the ability to easily adsorb at interfaces. When some time is allowed for the thermal sediments to reorganize at the interface, gas bubble can be efficiently entrapped and stabilized as observed by the higher porosity and foam volume of trials d and c. However, the benefit of sediment addition is not observed for more instantaneous foam generation as in the whipping test (i.e. high energy input, short time). The solubilization of thermal sediments (d) improves foam homogeneity and appearance although the resulting crema becomes slightly darker. The drainage rate is decreased resulting in more persistent crema. Finally, crema viscosity is enhanced delivering more mouthfeel upon consumption.

The invention claimed is:

1. A process of making a foaming aid, the process comprising:
   (i) providing a coffee extract by extraction of roast and ground coffee beans at a temperature of 150 to 180° C.; and
   (ii) isolating a surface active fraction of the coffee extract by centrifugation of the coffee extract to obtain the foaming aid, the surface active fraction is thermal sediments generated by the extraction and comprises polyphenolic compounds obtainable by Maillard and autoxidative polymerization of at least two 4-vinylcatechol monomers obtained from free caffeic acid or a caffeic acid moiety of a chlorogenic acid.

2. The process of claim 1, wherein the surface active fraction further comprises nitrogenous compounds.

3. The process according to claim 1, wherein the surface active fraction is a composition comprising at least one multiply hydroxylated phenylindane selected from the group consisting of trans-5,6-Dihydroxy-1-methyl-3-(3'-4'-dihydroxyphenyl) indane, cis-5,6-Dihydroxy-1-methyl-3-(3'-4'-dihydroxyphenyl) indane, 1,3-bis(3'-4'-dihydroxyphenyl) butane, trans-1,3-bis(3'-4'-dihydroxyphenyl)butene, 5,6-Dihydroxy-2-carboxy-1-methyl-3-(3'-4'-dihydroxyphenyl) indane, trans-4,5-dihydroxy-1-methyl-3-(3',4'-dihydroxyphenyl) indane, cis-4,5-dihydroxy-1-methyl-3-(3',4'-dihydroxyphenyl) indane, trans-5,6-dihydroxy-1-methyl-3-[3', 4'-dihydroxy-5'-(1-(3",4"-dihydroxyphenyl)-1-ethyl) phenyl] indane, cis-5,6-dihydroxy-1-methyl-3-[3',4'-dihydroxy-5'-(1-(3",4"-dihydroxyphenyl)-1-ethyl)phenyl] indane, and 5,6-dihydroxy-1-methyl-2-[1-(3',4'-dihydroxyphenyl)-1-ethyl]-3-(3",4"-dihydroxyphenyl) indane.

4. The process according to claim 1, wherein the surface active fraction is a composition comprising trans-5,6-Dihydroxy-1-methyl-3-(3'-4'-dihydroxyphenyl) indane, cis-5,6-Dihydroxy-1-methyl-3-(3'-4'-dihydroxyphenyl) indane, and trans-1,3-bis(3'-4'-dihydroxyphenyl)butene.

5. The process according to claim 1, wherein the surface active fraction is a composition comprising trans-5,6-Dihydroxy-1-methyl-3-(3'-4'-dihydroxyphenyl) indane and cis-5, 6-Dihydroxy-1-methyl-3-(3'-4'-dihydroxyphenyl) indane.

6. The process according to claim 1 further comprising treating the surface active fraction with an alkali.

7. A foaming aid obtainable from the process according to claim 1.

8. A method comprising:
   providing a foaming aid formed through the steps of (i) providing a coffee extract by extraction of roast and ground coffee beans at a temperature of 150 to 180° C.; and (ii) isolating a surface active fraction of the coffee extract by centrifugation of the coffee extract to obtain the foaming aid, the surface active fraction is thermal sediments generated by the extraction and comprises polyphenolic compounds obtainable by Maillard and autoxidative polymerization of at least two 4-vinylcatechol monomers obtained from free caffeic acid or a caffeic acid moiety of a chlorogenic acid; and
   adding the foaming aid to a beverage.

9. The method according to claim 8, wherein the beverage is a coffee product.

10. A process of making a coffee product, the process comprising:
    (a) providing a coffee extract by extraction of roast and ground coffee beans at a temperature of 150 to 180° C.;
    (b) isolating a surface active fraction of the coffee extract by centrifugation of the coffee extract to obtain a foaming aid, the surface active fraction is thermal sediments generated by the extraction and comprises polyphenolic compounds obtainable by Maillard and autoxidative polymerization of at least two 4-vinylcatechol monomers obtained from free caffeic acid or a caffeic acid moiety of a chlorogenic acid;
    (c) concentrating the coffee extract from which the surface active fraction has been isolated;
    (d) adding the surface active fraction to the concentrated coffee extract;
    (e) injecting gas into the concentrated coffee extract to which the surface active fraction has been added; and
    (f) drying the gas-injected coffee extract into a powder.

11. The process of making a coffee product according to claim 10, wherein the coffee product is selected from the group consisting of instant coffee, instant espresso coffee, liquid coffee concentrate, coffee mixes, coffee mixtures, roast and ground coffee with or without capsules, mixes of roast and ground and instant coffee, and ready-to-drink coffee beverages.

12. A coffee product obtained by the process according to claim 10.

* * * * *